United States Patent
Soane et al.

(10) Patent No.: US 9,919,938 B2
(45) Date of Patent: Mar. 20, 2018

(54) SYSTEMS AND METHODS FOR REMOVING FINELY DISPERSED PARTICLES FROM MINING WASTEWATER

(71) Applicants: Soane Mining, LLC, Cambridge, MA (US); Audrey Heidt, Waltham, MA (US)

(72) Inventors: David S. Soane, Chestnut Hill, MA (US); Nathan Ashcraft, Somerville, MA (US); Phyo Kyaw

(73) Assignee: Soane Mining, LLC, Cambridge, MA (US)

(*) Notice: Subject to any disclaimer, the term of this patent is extended or adjusted under 35 U.S.C. 154(b) by 0 days.

(21) Appl. No.: 13/788,936

(22) Filed: Mar. 7, 2013

(65) Prior Publication Data

US 2013/0336877 A1 Dec. 19, 2013

Related U.S. Application Data

(60) Provisional application No. 61/661,152, filed on Jun. 18, 2012.

(51) Int. Cl.
*B01D 21/01* (2006.01)
*C02F 1/56* (2006.01)
(Continued)

(52) U.S. Cl.
CPC ............. *C02F 1/56* (2013.01); *B01D 21/01* (2013.01); *B01D 21/26* (2013.01); *C02F 1/52* (2013.01);
(Continued)

(58) Field of Classification Search
None
See application file for complete search history.

(56) References Cited

U.S. PATENT DOCUMENTS 3,198,839 A 8/1965 Lalet
3,352,424 A 11/1967 Guebert et al.
(Continued)

FOREIGN PATENT DOCUMENTS

AU 640296 6/1992
CN 101087733 A 12/2007
(Continued)

OTHER PUBLICATIONS

Adsorption of Polyetheramines on Montmorillonite at High pH by Cui et al. (Cui). Langmuir. Aug. 17, 2010.*
(Continued)

*Primary Examiner* — Katherine Zalasky
*Assistant Examiner* — Kara Graber
(74) *Attorney, Agent, or Firm* — Elmore Patent Law Group, P.C.; Mahreen Hoda; Carolyn Elmore

(57) ABSTRACT

The invention is directed to systems and methods of removing particulate matter from a fluid, comprising: pre-activating the particulate matter to form a pre-activated particulate matter; providing an activating material capable of being affixed to the pre-activated particulate matter; affixing the activating material to the pre-activated particulate matter to form an activated particle; providing an anchor particle and providing a tethering material capable of being affixed to the anchoring particle; and attaching the tethering material to the anchor particle and the activated particle to form a removable complex in the fluid that comprises the particulate matter, wherein the particulate matter is derived from a mining operation.

11 Claims, 3 Drawing Sheets

(51) Int. Cl.
   *B01D 21/26* (2006.01)
   *C02F 1/52* (2006.01)
   *C02F 1/54* (2006.01)
   *C02F 103/10* (2006.01)

(52) U.S. Cl.
   CPC ............ *C02F 1/54* (2013.01); *C02F 2103/10* (2013.01); *C02F 2301/08* (2013.01); *C02F 2305/12* (2013.01)

(56) References Cited

U.S. PATENT DOCUMENTS

| | | | |
|---|---|---|---|
| 3,723,310 A | 3/1973 | Lang et al. | |
| 3,932,275 A | 1/1976 | Mewes et al. | |
| 3,996,696 A | 12/1976 | Davidtz | |
| 4,346,010 A | 8/1982 | Ogino et al. | |
| 4,363,749 A | 12/1982 | Weiss et al. | |
| 4,467,055 A * | 8/1984 | Machurat et al. | 523/200 |
| 4,498,993 A | 2/1985 | Raba, Jr. et al. | |
| 4,569,768 A | 2/1986 | McKinley | |
| 4,597,770 A | 7/1986 | Forand et al. | |
| 4,882,066 A | 11/1989 | Portier | |
| 4,913,585 A | 4/1990 | Thompson et al. | |
| 5,071,587 A | 12/1991 | Perman | |
| 5,073,272 A | 12/1991 | O'Neill et al. | |
| 5,190,660 A | 3/1993 | Lindoy et al. | |
| 5,330,546 A | 7/1994 | Ramesh et al. | |
| 5,393,435 A | 2/1995 | Deans et al. | |
| 5,433,865 A | 7/1995 | Laurent | |
| 5,449,464 A | 9/1995 | El Shall | |
| 5,453,206 A | 9/1995 | Browne | |
| 5,512,526 A | 4/1996 | Greco | |
| 5,535,890 A | 7/1996 | Behl et al. | |
| 5,543,056 A | 8/1996 | Murcott et al. | |
| 5,635,073 A | 6/1997 | Aktor et al. | |
| 5,670,435 A | 9/1997 | Kajita | |
| 5,703,272 A | 12/1997 | Abe et al. | |
| 5,725,805 A * | 3/1998 | Kemnetz et al. | 516/142 |
| 5,798,046 A | 8/1998 | Greer et al. | |
| 5,843,315 A | 12/1998 | Baughn et al. | |
| 5,863,982 A | 1/1999 | Huang et al. | |
| 6,042,732 A | 3/2000 | Jankowski et al. | |
| 6,184,302 B1 | 2/2001 | Eyrisch | |
| 6,203,711 B1 | 3/2001 | Moffett | |
| 6,214,237 B1 | 4/2001 | Kustra et al. | |
| 6,403,726 B1 | 6/2002 | Ward | |
| 6,827,874 B2 | 12/2004 | Souter et al. | |
| 6,890,431 B1 | 5/2005 | Eades et al. | |
| 6,919,031 B2 | 7/2005 | Blumenschein et al. | |
| 7,001,525 B2 | 2/2006 | Binot et al. | |
| 7,153,436 B2 | 12/2006 | Bair et al. | |
| 7,255,793 B2 | 8/2007 | Cort | |
| 7,875,189 B2 | 1/2011 | Jaeger et al. | |
| 7,901,583 B2 | 3/2011 | McColl et al. | |
| 8,011,514 B2 | 9/2011 | Wright et al. | |
| 8,127,930 B2 | 3/2012 | Wright et al. | |
| 8,187,470 B2 | 5/2012 | Wang et al. | |
| 8,557,123 B2 | 10/2013 | Berg et al. | |
| 2002/0139754 A1 | 10/2002 | Miller et al. | |
| 2003/0153001 A1 | 8/2003 | Soane et al. | |
| 2004/0116304 A1 | 6/2004 | Wu et al. | |
| 2004/0159613 A1 | 8/2004 | Bair et al. | |
| 2005/0150844 A1 | 7/2005 | Hyndman et al. | |
| 2006/0006116 A1 | 1/2006 | Scheimann et al. | |
| 2006/0151360 A1 | 7/2006 | Wright et al. | |
| 2007/0085055 A1 | 4/2007 | Sikes et al. | |
| 2007/0209971 A1 | 9/2007 | Duyvesteun et al. | |
| 2007/0289911 A1 | 12/2007 | Cymerman et al. | |
| 2009/0206040 A1 | 8/2009 | Berg et al. | |
| 2010/0098493 A1 | 4/2010 | McColl et al. | |
| 2011/0094970 A1 | 4/2011 | Kincaid et al. | |
| 2011/0131873 A1 | 6/2011 | Soane et al. | |
| 2011/0252701 A1 | 10/2011 | Soane et al. | |
| 2012/0029120 A1 | 2/2012 | Soane et al. | |
| 2012/0061321 A1 | 3/2012 | Soane et al. | |
| 2013/0134103 A1 | 5/2013 | Berg et al. | |
| 2013/0193078 A1 | 8/2013 | Soane et al. | |
| 2014/0166587 A1 | 6/2014 | Berg et al. | |
| 2014/0377166 A1 | 12/2014 | Soane et al. | |

FOREIGN PATENT DOCUMENTS

| | | |
|---|---|---|
| WO | 00/71471 A1 | 11/2000 |
| WO | 2004/060819 A1 | 7/2004 |
| WO | 2006047225 A2 | 5/2006 |

OTHER PUBLICATIONS

Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.

"Actiflo™ Process : Key to Efficient High-Rate Clarification," available online at http://www.veoliawaterst.com/indepth/mining_fluent/13262,actiflo_process.htm.

Muylwyk, Q., et al., "Practical experiences in sand ballasted clarification processes," Proceedings of the Annual Conference of the Western Canada Water and Wastewater Association, Abstract (2004).

Zhang, et al., "Development of an Ultra-fine Coal Dewatering Technology and an Integrated Flotation-Dewatering System for Coal Preparation Plants," DOE Grant Final Report. Mar. 1, 2007.

Mathew, B., et al., "Metal complexation of crosslinked polyacrylamide-supported dithiocarbamates: Effect of the molecular character and extent of crosslinking on complexation," Proc. Indian Acad. Sci., 104(1): 43-56 (1991).

Berg, et al., U.S. Appl. No. 14/027,621, filed Sep. 16, 2013.

* cited by examiner

SYSTEMS AND METHODS FOR REMOVING FINELY DISPERSED PARTICLES FROM MINING WASTEWATER

RELATED APPLICATION

This application claims the benefit of U.S. Provisional Application Ser. No. 61/661,152, filed Jun. 18, 2012. The entire contents of the above application are incorporated by reference herein.

PARTIES TO A JOINT RESEARCH AGREEMENT

Soane Mining, LLC and Soane Energy, LLC are parties to a "joint research agreement" as defined in 35 U.S.C. 103(c)(3).

BACKGROUND

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

An example of a high volume water consumption process is the processing of naturally occurring ores. During the processing of such ores, colloidal particles, such as clay and mineral fines, are released into the aqueous phase often due to the introduction of mechanical shear associated with the hydrocarbon-extraction process. In addition to mechanical shear, alkali water is sometimes added during extraction, creating an environment more suitable for colloidal suspensions. A common method for disposal of the resulting "tailing" solutions, which contain fine colloidal suspensions of clay and minerals, water, sodium hydroxide and small amounts of remaining hydrocarbon, is to store them in "tailings ponds." These ponds take years to settle out the contaminating fines, posing severe environmental challenges. It is desirable to identify a method for treating tailings from mining operations to reduce the existing tailings ponds, and/or to prevent their further expansion.

Certain mining processes use a large volume of water, placing strains on the local water supply. It would be advantageous, therefore, to reuse the water from tailings streams, so that there is less need for fresh water in the beneficiation process. In addition, certain mining processes can create waste streams of large-particle inorganic solids. This residue is typically removed in initial separation phases of processing due to its size, insolubility and ease of sequestering. Disposal or storage of this waste material represents a problem for the mining industry. It would be advantageous to modify this material so that it could be useful in situ, for example as part of a treatment for the mining wastewater.

A number of mining operations yield wastewater streams containing fine particles produced during the processing or beneficiation of ores. As an example, the production of aluminum from bauxite ore according to the commonly-used Bayer process takes place by treating the crushed or ground ore with a hot sodium hydroxide solution to produce alumina ($Al_2O_3$), which can be reduced to yield aluminum. The insoluble part of the bauxite ore is carried away as an alkaline aqueous slurry called "red mud." Red mud is a complex material with characteristics that depend on the bauxite from which it is derived, and on the process parameters that produce it. Common characteristics of red mud include a water suspension of fine particles suspended in a highly alkaline water solution, mainly composed of iron oxides, but having a variety of elements and mineralogical phases. The red mud fluid stream, containing about 7 to 9% solids, is typically sequestered in a containment area (an old excavated mine or a manmade lake called a tailings pond) so that the solids can settle out by gravity. About two tons of red mud is produced per ton of metallic aluminum. The magnitude of red mud associated with aluminum production poses a significant environmental challenge for countries where bauxite is refined. A small country like Jamaica, for example, where bauxite refinement is a leading industry, lacks open land suitable for disposal of the hazardous red mud; moreover, containment problems such as leakage, groundwater seepage and rupture of tailings pond dikes makes disposal of this material even more hazardous.

As another example, iron is produced from an ore called taconite that contains magnetite, an amalgam of iron oxides with about 25 to 30% iron. To extract the iron from the ore, the ore is crushed into fine particles so that the iron can be removed from the non-ferromagnetic material in the ore by a magnetic separator. The iron recovered by the magnetic separator is then processed into "pellets" containing about 65% iron that can be used for industrial purposes like steel-making Ore material not picked up by the magnetic separator is considered waste material, or gangue, and is discarded. Gangue typically includes non-ferrous rocks, low-grade ore, waste material, sand, rock and other impurities that surround the iron in the ore. For every ton of pellets produced, about 2.7 tons of gangue is also produced. The waste is removed from the beneficiation site as a slurry of suspended fine particles, termed tailings. About two-thirds of the tailings are classified as "fine tailings," composed of extremely fine rock particles more than 90% of which are smaller than 75 microns, or −200 mesh); typically, the fine tailings they have little practical use at the mines, and end up sequestered in containment areas such as tailings ponds.

Another mining operation with similar wastewater handling issues is the production of kaolin. Kaolin ("china clay") is a white claylike material composed mainly of a hydrated aluminum silicate admixed with other clay minerals. Kaolin, used for a variety of industrial applications, is mined and then processed; dry processes and wet processes are available. Wet processes, used extensively to produce additives for the paper industry, yield a slurry that is fractionated into coarse and fine fractions using a variety of mechanical means like centrifuges, hydrocyclones and hydroseparators. Despite repeated processing, a fraction of the slurry contains fine particulate kaolin that cannot be separated from other fine particulate waste residues. This material is deemed waste, and is sequestered in containment areas, either manmade lagoons or spent kaolin mines.

Trona (trisodium hydrogendicarbonate dihydrate) is a mineral that is mined in the United States as a source of sodium carbonate. After the trona is mined, it is processed by exposing it to aqueous solvents so that the sodium carbonate can be recovered. The insoluble materials in the trona, including oil shales, mudstone and claystone, is carried away as tailings for disposal. Tailings, containing suspended fine particles in a fluid stream, may be transported to confinement areas, like tailings ponds; alternatively, tailings may be pumped into abandoned areas of the mine, with retaining walls or other barriers being constructed as needed to prevent the tailings from entering mine areas that are still active.

Phosphatic ore (fluorapatite) mining is a major worldwide industry, with over 150 million tons of ore mined annually. Domestic mining produces around 30 million tons of ore, about 75% of which comes from Florida. During the extraction of phosphate from the mined ore, a process called beneficiation, significant quantities of waste clay and sand are generated. The approximate ratio of the extracted ore is 1:1:1 of fluorapatite to clay to sand. Thus, with the 30 million tons of ore being mined, around 10 million tons of waste clay and 10 million tons of waste sand must be disposed of annually in the U.S.

The clay that is produced by beneficiation exists in a 3 to 5% (by weight) slurry. The current practice of clay disposal is to store the clay slurry in large ponds known as clay settling areas (CSAs), where the clay is allowed to separate from the water suspension by gravity over long periods of time, for example over several decades. For a typical phosphate mine, up to 60% of the surface area of the mine ends up as CSAs. Estimates are that around 5,000 acres of land is turned into CSAs annually in central Florida. Left untreated it can take several decades before CSAs become stable enough for reuse to be considered. Because of the huge environmental and economic impacts of CSAs, a simple, robust, and cost-effective method for treating the clay slurry waste is needed.

While other methods for separating clay fines from wastewater slurries have been tried for phosphate mining, they have proven to be difficult and costly. For example, the Dewatering Instantaneously with Pulp Recycle (DIPR) process has been under investigation for over 20 years at the Florida Institute of Phosphate Research (FIPR), disclosed in U.S. Pat. No. 5,449,464. According to this disclosure, clay slurry is treated with a flocculant and a pulp material to dewater the slurry. While this approach has been studied for over two decades, its high cost, partly due to capital costs of equipment to dewater the treated slurry to high solids content, has prevented its adoption. There remains a need in the art, therefore, for an effective and economical approach to treating the clay-bearing wastewater slurry that is produced during phosphate beneficiation.

As another example, potash, originally known as wood ash, refers to a collection of potassium salts and other potassium compounds, the most abundant being potassium chloride. Potash accounts for the majority of potassium produced in the world. Approximately 95% of potash produced is used for fertilizers, and the rest in manufacturing soaps, glass, ceramics, chemical dyes, etc. Mining for potash mainly consists of extraction from buried evaporates using underground or solution mining. The tailings streams produced from potash mining are usually slurry mixtures of clay in combination with high levels of sodium chloride and other salts. When released into the environment untreated, the suspensions in these tailings take a long time to settle, creating tailings ponds that can take up to 40 to about 70% of the mine area. During settling time, the mechanical integrity of the sedimentation is low due to high water content and the area is not fit to be used for any purpose. For potash, it is desirable to treat the tailings in order to facilitate sedimentation of clay and salt suspensions and increase water recovery. However, the high salt content of these tailings proves hostile to most conventional flocculants (e.g., anionic polyacrylamides). It has been observed that the salinity of potash tailings is high enough to cause precipitation and other adverse effects to such flocculants. There remains a need in the art, therefore, for technologies specifically addressing the problems associated with potash tailings treatment.

Treatment processes for wastewater in mining industries have been disclosed in U.S. Pat. No. 8,349,188 (U.S. patent application Ser. No. 12/792,181), the teachings of which are incorporated herein by reference. Treatment processes for wastewater in mining industries including oil sands mining have been disclosed in WO 2010/098786 (PCT Application No. PCT/US09/54278), the teachings of which are incorporated herein by reference. Modifications in these systems and methods would advantageously improve their efficacy and efficiency.

SUMMARY

Disclosed herein, in embodiments, are methods of removing particulate matter from a fluid, comprising: pre-activating the particulate matter to form a pre-activated particulate matter; providing an activating material capable of being affixed to the pre-activated particulate matter; affixing the activating material to the pre-activated particulate matter to form an activated particle; providing an anchor particle and providing a tethering material capable of being affixed to the anchoring particle; and attaching the tethering material to the anchor particle and the activated particle to form a removable complex in the fluid that comprises the particulate matter, wherein the particulate matter is derived from a mining operation. In embodiments, the fluid comprises waste tailing fluid from a mining operation. In embodiments, the fluid comprises impounded tailings in a containment area. In embodiments, the pre-activation step uses a pre-activation material. In embodiments, the pre-activation material can be selected from the group consisting of an anionic pre-activation agent, a cationic pre-activation agent and a non-ionic pre-activation agent. In embodiments, the pre-activation material comprises a fatty acid or a fatty acid salt. In embodiments, the methods further comprise removing the removable complex from the fluid. The removable complex can be removed by filtration, centrifugation, or gravitational settling. In embodiments, the anchor particle comprises sand, or comprises a material indigenous to the mining operation. In embodiments, the particulate matter comprises clay fines. In embodiments, the methods further comprise chemically modifying the fluid. Further disclosed herein are products obtained or obtainable by the foregoing methods.

Also disclosed herein, in embodiments, are systems for removing particulate matter from a fluid, comprising a pre-activating material capable of being affixed to the particulate matter to form a pre-activated particle, an activating material capable of being affixed to the pre-activated particle to form an activated particle, a tether-bearing anchor particle capable of attaching to the activated particle to form a removable complex in the fluid, wherein the removable complex comprises the particulate matter, and a separator for separating the removable complex from the fluid, thereby removing the particulate matter. In embodiments, the particulate matter is derived from a mining operation. In embodiments, the pre-activating material is selected from the group consisting of an anionic pre-activation agent, a cationic pre-activation agent and a non-ionic pre-activation agent. In embodiments, the pre-activating material comprises a fatty acid or a fatty acid salt.

DETAILED DESCRIPTION

Figure 1:
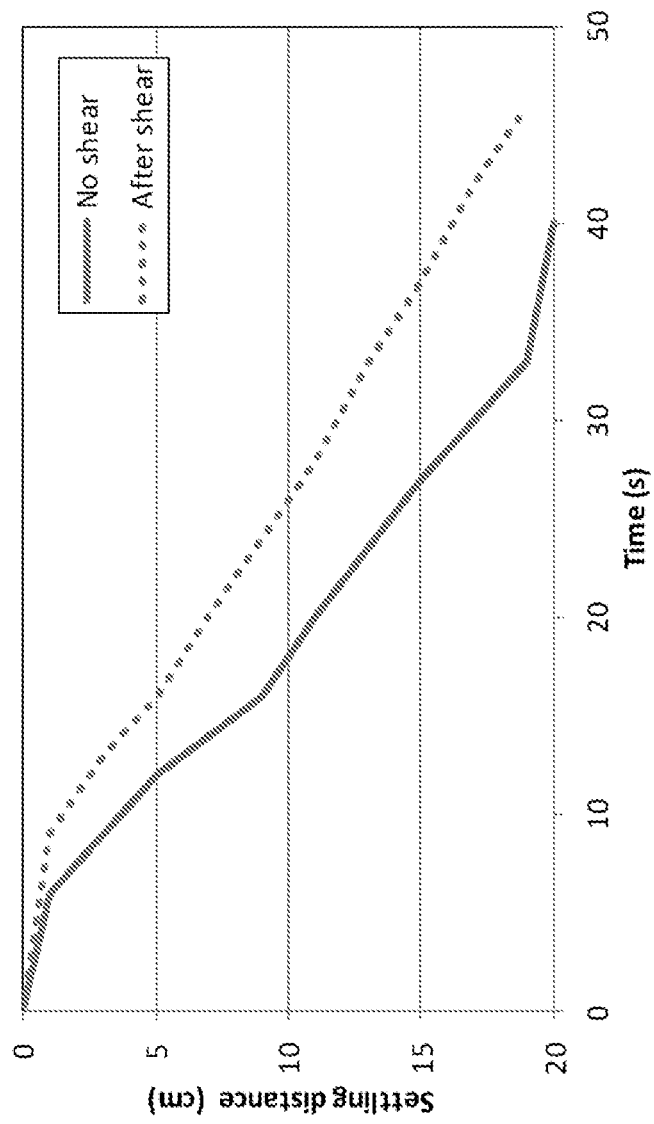
FIG. 1 shows a graph illustrating settling rates after treatment with activator and tether polymers, before and after shear.

Disclosed herein are systems and methods for removing finely dispersed materials or "fines" from wastewater streams produced during mining operations. In embodiments, the clay fines produced during phosphate beneficiation can be removed with these systems and methods. In embodiments, other types of fines can be removed where these contaminants are suspended in aqueous solutions.

These systems and methods employ four subprocesses: (1) "pre-activation" of the wastewater stream by exposing the fines to one or more selected small molecules that attach to the fines; (2) the "activation" of the wastewater stream bearing the pre-activated fines by exposing them to a dose of a flocculating polymer that attaches to them; (3) the preparation of "anchor particles," particles, such as sand, by treating them with a "tether" polymer that attaches to the anchor particles; (4) adding the tether-bearing anchor particles to the pre-activated/activated wastewater stream containing the fines, so that the tether-bearing anchor particles form complexes with the pre-activated/activated fines. The activator polymer and the tether polymer are selected so that they have a natural affinity with each other. The pre-activation step enhances the affixation of the activation polymer to the pre-activated fines, so that the consolidation of treated fines with tether-bearing anchor particles proceeds more rapidly and forms more tightly-bonded complexes when compared to wastewater treatment methodologies previously known in the art.

Disclosed herein are systems and methods for enhancing the settlement rate of dispersed fine materials by incorporating them within a coarser particulate matrix, so that solids can be removed from aqueous suspension as a material having mechanical stability. Combining the pre-activated/activated fines with the tether-bearing anchor particles rapidly forms a solid, cohesive complex that can be separated from the suspension fluid with a separator, resulting in a stable mass that can be easily and safely stored, along with clarified water that can be used for other industrial purposes. As used herein, the term "separator" refers to any mechanism, device, or method that separates the solid complex from the suspension fluid, i.e., that separates the removable complexes of tether-bearing anchor particle and pre-activated/activated particles from the fluid.

Following the separation process, the stable mass can be used for beneficial purposes, as can the clarified water. As an example, the clarified water could be recycled for use on-site in further processing and beneficiation of ores. As an example, the stable mass could be used for construction purposes at the mine operation (roads, walls, etc.), or could be used as a construction or landfill material offsite. Dewatering to separate the solids from the suspension fluid can take place in seconds, relying only on gravity filtration.

Generally speaking, the pre-activation step exposes the fines to a dose of a selected small molecule, having characteristics as described below in more detail. Then the pre-activated fines in the wastewater stream are activated by exposure to a dosing of flocculating polymer. Separately, the sand particles, referred to as "anchor" particles, are exposed to a polymer "tether." The activator and tether are chosen so that they have a natural affinity towards each other. Combining the two streams, the pre-activated/activated fines with tether-bearing anchors, produces a stable solid that forms rapidly. The solid can be separated from the clarified water in which it resides by a dewatering process, for example by gravity filtration, which can quickly yield a mass that can be easily and safely stored.

In embodiments, the systems and methods disclosed herein provide methods for treating and disposing of phosphatic clays, in conjunction with the sand waste also generated during phosphatic ore beneficiation. In other embodiments, the systems and methods disclosed herein provide methods for treating and disposing of fines collected from tailings streams. Advantageously, coarse waste from mining operations can be used as anchor particles, or waste-like materials (sand, crushed rock, or other waste materials) can be brought on-site to be used for anchor particles.

In embodiments, the systems and methods disclosed herein can be applied to the treatment of wastewater streams containing fine particles produced during the processing or beneficiation of ores. The systems and methods disclosed herein can be combined with routine modifications of the fluid stream in anticipation of treatment, in the course of treatment, or following treatment. For example, pH adjustments of the fluid stream can be carried out. In embodiments, the systems and methods disclosed herein can be adapted to and optimized for the needs of a specific mining industry for treatment of particulate suspensions in fluid streams of waste products.

For example, following the production of aluminum, e.g., from bauxite ore according to the commonly-used Bayer process, the insoluble part of the bauxite ore is carried away as an alkaline aqueous slurry called "red mud." Red mud typically comprises a water suspension of fine particles suspended in a highly alkaline water solution, mainly composed of iron oxides, but having a variety of elements and mineralogical phases. The fluid stream can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to waste produced during the beneficiation of iron, for example, iron produced from taconite. As iron is produced from the ore, waste material called gangue is generated. The gangue is removed from the beneficiation site as a slurry of suspended fine particles, termed tailings. About two-thirds of the tailings are classified as "fine tailings," a waste material suitable for treatment by the systems and methods disclosed herein. In embodiments, the fluid stream containing the fine tailings can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to waste produced during the beneficiation of kaolin. The processing of kaolin yields a slurry that can be separated into a fraction that contains fine particulate kaolin that cannot be readily removed from the fluid stream. This fluid stream is suitable for treatment by the systems and methods disclosed herein. In embodiments, the fluid stream containing the fine tailings can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to the waste produced during the mining of trona. Following the mining and beneficiation of trona, insoluble materials carried away as waste can include fine particulate tailings transported in a fluid stream. This fluid stream is suitable for treatment by the systems and methods disclosed herein. In embodiments, the fluid stream containing the fine tailings can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to the waste produced during the mining of phosphate. During the beneficiation of phosphate ore, waste materials including fine clay particles (clay fines) are produced and are carried away in a fluid waste stream or slurry. This fluid stream is suitable for treatment by the systems and methods disclosed herein. In embodiments, the fluid stream containing the fine tailings can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to the waste produced during the mining of potash. For potash, it is desirable to treat the tailings in order to facilitate sedimentation of clay and salt suspensions and increase water recovery. However, the high salt content of these tailings proves hostile to most conventional flocculants (e.g., anionic polyacrylamides). It has been observed that the salinity of potash tailings is high enough to cause precipitation and other adverse effects to such flocculants. During the beneficiation of potash, waste materials including fine clay particles (clay fines) are produced and are carried away in a fluid waste stream or slurry. This fluid stream is suitable for treatment by the systems and methods disclosed herein. In embodiments, the fluid stream containing the fine tailings can be treated with a pre-activator and an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

A number of other mining operations produce fine particulate waste carried in fluid streams. Such fluid streams are suitable for treatment by the systems and methods disclosed herein. Modification of the fluid stream before, during or after application of these systems and methods may be advantageous. For example, pH of the fluid stream can be adjusted. Examples of additional mineral mining operations that have a waste slurry stream of fine particulate matter can include the following mining processes: sand and gravel, nepheline syenite, feldspar, ball clay, kaolin, olivine, dolomite, calcium carbonate containing minerals, bentonite clay, magnetite and other iron ores, barite, and talc.

1. Activation

As used herein, the term "activation" refers to the interaction of an activating material, such as a polymer, with suspended particles in a liquid medium, such as an aqueous solution. As further disclosed herein, the activation step takes place after a pre-activation step that prepares the suspended particles so that their affinity with the activator polymer is enhanced. An "activator polymer" can carry out this activation. In embodiments, high molecular weight polymers can be introduced into the particulate dispersion as activator polymers, so that these polymers interact, or complex, with fine particles. The polymer-particle complexes interact with other similar complexes, or with other particles, and form agglomerates.

This "activation" step can prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the pre-activated fine particles are coated by an activating material such as a polymer, these coated materials can adopt some of the surface properties of the polymer or other coating. This altered surface character in itself can be advantageous for sedimentation, consolidation and/or dewatering. In another embodiment, activation can be accomplished by chemical modification of the particles. For example, oxidants or bases/alkalis can increase the negative surface energy of particulates, and acids can decrease the negative surface energy or even induce a positive surface energy on suspended particulates. In another embodiment, electrochemical oxidation or reduction processes can be used to affect the surface charge on the particles. These chemical modifications can produce activated particulates that have a higher affinity for tethered anchor particles as described below. In embodiments, as described below, the activation step is preceded by a pre-activation step that conditions the fines to be more receptive to activation.

Particles suitable for modification, or activation, can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. Sand or other fine fraction of the solids recovered from the mining process itself is a preferred particle source for activation. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, the particle can be substantially larger than the fine particulates it is separating out from the process stream. For example, for the removal of particulate matter with approximate diameters less than about 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be advantageously used as the particle to be modified for removing particulate matter from the waste stream of phosphate mining, because sand is a byproduct of phosphate beneficiation and is therefore found abundantly at phosphate mining sites.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

The "activation" step may be performed using flocculants or other polymeric substances. Preferably, the polymers or flocculants can be charged, including anionic or cationic polymers.

In embodiments, anionic polymers can be used, including, for example, olefinic polymers, such as polymers made from polyacrylate, polymethacrylate, partially hydrolyzed polyacrylamide, and salts, esters and copolymers thereof (such as sodium acrylate/acrylamide copolymers, polyacrylic acid, polymethacrylic acid), sulfonated polymers, such as sulfonated polystyrene, and salts, esters and copolymers thereof, and the like. Suitable polycations include: polyvinylamines, polyallylamines, polydiallyldimethylammoniums (e.g., polydiallyldimethylammonium chloride), branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, polyvinylamine, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below. In embodiments, activator polymers with hydrophobic modifications can be used. Flocculants such as those sold under the trademark MAGNAFLOC® by Ciba Specialty Chemicals can be used.

In embodiments, activators such as polymers or copolymers containing carboxylate, sulfonate, phosphonate, or hydroxamate groups can be used. These groups can be incorporated in the polymer as manufactured; alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

The activated particle can also be an amine functionalized or modified particle. As used herein, the term "modified particle" can include any particle that has been modified by the attachment of one or more amine functional groups as described herein. The functional group on the surface of the particle can be from modification using a multifunctional coupling agent or a polymer. The multifunctional coupling agent can be an amino silane coupling agent as an example. These molecules can bond to a particle surface (e.g., metal oxide surface) and then present their amine group for interaction with the particulate matter. In the case of a polymer, the polymer on the surface of the particles can be covalently bound to the surface or interact with the surface of the particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quarternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quarternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred. In embodiments, the fine particles have been pretreated with a pre-activator that facilitates their activation, as described below in more detail.

To obtain activated fine materials, the activator could be introduced into a liquid medium through several different means. For example, a large mixing tank could be used to mix an activating material with tailings from mining operations that contain fine particulate materials. Alternatively, the activating material can be added along a transport pipeline and mixed, for example, by a static mixer or series of baffles. Activated particles are produced that can be treated with one or more subsequent steps of tethering and anchor-separation.

The particles that can be activated are generally fine particles that are resistant to sedimentation. Examples of particles that can be filtered in accordance with the invention include metals, sand, inorganic, or organic particles. The particles are generally fine particles, such as particles having a mean diameter of less than 50 microns or particle fraction that remains with the filtrate following a filtration with, for example, a 325 mesh filter such as a Tyler sieve. The particles to be removed in the processes described herein are also referred to as "fines."

2. Tethering

As used herein, the term "tethering" refers to an interaction between an activated fine particle and an anchor particle (as described below). In accordance with these systems and methods, the term "tethering" also refers to the interaction between an anchor particle and an activated fine particle that has been pre-activated (termed herein a "pre-activated/activated" particle). The anchor particle can be treated or coated with a tethering material. The tethering material, such as a polymer, forms a complex or coating on the surface of the anchor particles such that the tethered anchor particles have an affinity for the activated fines or pre-activated/activated fines. In embodiments, the selection of tether and activator materials is intended to make the two solids streams complementary so that the pre-activated/activated fine particles become tethered, linked or otherwise attached to the anchor particle. When attached to pre-activated/activated fine particles via tethering, the anchor particles enhance the rate and completeness of sedimentation or removal of the fine particles from the fluid stream.

In accordance with these systems and methods, the tethering material acts as a complexing agent to affix the pre-activated/activated particles to an anchor material. In embodiments, sand can be used as an anchor material, as may a number of other substances, as set forth in more detail below. In embodiments, a tethering material can be any type of material that interacts strongly with the activating material and that is connectable to an anchor particle.

As used herein, the term "anchor particle" refers to a particle that facilitates the separation of fine particles. Generally, anchor particles have a density that is greater than the liquid process stream. For example, anchor particles that have a density of greater than 1.3 g/cc can be used. Additionally or alternatively, the density of the anchor particles can be greater than the density of the fine particles or pre-activated/activated particles. Alternatively, the density is less than the dispersal medium, or density of the liquid or aqueous stream. Alternatively, the anchor particles are simply larger than the fine particles or the pre-activated/activated fine particles being removed. In embodiments, the anchor particles are chosen so that, after complexing with the fine particulate matter, the resulting complexes can be removed via a skimming process rather than a settling-out process, or they can be readily filtered out or otherwise skimmed off. In embodiments, the anchor particles can be chosen for their low packing density or potential for developing porosity. A difference in density or particle size can facilitate separating the solids from the medium.

For example, for the removal of particulate matter with an approximate mean diameter less than about 50 microns, anchor particles may be selected having larger dimensions, e.g., a mass mean diameter of greater than about 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.9 g/cc, for example, 0.5 g/cc, to remove fine particles from an aqueous process stream.

Suitable anchor particles can be formed from organic or inorganic materials, or any mixture thereof. Advantageously, anchor particles can be selected that are indigenous to a particular geographical region where the particulate removal process would take place. For example, sand can be used as the anchor particle for use in removing fine particulate matter from the waste stream (tailings) of phosphate mining. In referring to an anchor particle, it is understood that such a particle can be made from a single substance or can be made from a composite. For example, an anchor particle can be formed from a particle of one type of biomass combined with a particle of another type of biomass.

In accordance with these systems and methods, inorganic anchor particles can include one or more materials such as calcium carbonate, dolomite, calcium sulfate, kaolin, talc, titanium dioxide, sand, diatomaceous earth, aluminum hydroxide, silica, other metal oxides and the like. In embodiments, the coarse fraction of the solids recovered from the mining process itself can be used for anchor particles. Organic particles can include one or more materials such as biomass, starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, can comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants. Organic materials can include various forms of organic waste, including biomass and including particulate matter from post-consumer waste items such as old tires and carpeting materials.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

Advantageously, anchor particles can be selected from biomass, so that they complex with the fines to form a biomass-fines composite solid. Biomass can be derived from vegetable sources or animal sources. Biomass can be derived from waste materials, including post-consumer waste, animal or vegetable waste, agricultural waste, sewage, and the like. In embodiments, the biomass sourced materials are to be processed so that they form particles of an appropriate size for tethering and combining with the pre-activated/activated fines. Particle sizes of, e.g., 0.01 to 50 millimeters are desirable. Processing methods can include grinding, milling, pumping, shearing, and the like. For example, hammer mills, ball mills, and rod mills can be used to reduce oversized materials to an appropriate size. In embodiments, additives might be used in the processing of the anchor particles to improve efficiency, reduce energy requirements, or increase yield. These processing additives include polymers, surfactants, and chemicals that enhance digestion or disintegration. Optionally, other treatment modalities, such as exposure to cryogenic liquids (e.g., liquid nitrogen or solid carbon dioxide) can be employed to facilitate forming anchor particles of appropriate size from biomass. It is understood that biomass-derived anchor particles can be formed as particles of any morphology (regular or irregular, plate-shaped, flakes, cylindrical, spherical, needle-like, etc.) or can be formed as fibers. Fibrous materials may be advantageous in that they facilitate dewatering/filtration of the composite material being formed by these systems and methods, and they can add strength to such composite materials.

Vegetable sources of biomass can include fibrous material, particulate material, amorphous material, or any other material of vegetable origin. Vegetable sources can be predominately cellulosic, e.g., derived from cotton, jute, flax, hemp, sisal, ramie, and the like. Vegetable sources can be derived from seeds or seed cases, such as cotton or kapok, or from nuts or nutshells, including without limitation, peanut shells, walnut shells, coconut shells, and the like. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, corn husks, rice hulls, vines or banana plants. Vegetable sources can include fruits of plants or seeds, such as coconuts, peach pits, olive pits, mango seeds, corncobs or corncob byproducts ("bees wings") and the like. Vegetable sources can include the stalks or stems of a plant, such as wheat, rice, barley, bamboo, and grasses. Vegetable sources can include wood, wood processing products such as sawdust, and wood, and wood byproducts such as lignin.

Animal sources of biomass can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can include dairy byproducts such as whey, whey permeate solids, milk solids, and the like. Animal sources can be derived from feathers of birds or scales of fish.

In embodiments, the particle can be substantially larger than the fine particulates it is separating out from the process stream. For example, for the removal of particulate matter with approximate diameters less than about 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of certain mining operations.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

Anchor particle sizes (as measured as a mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. Anchor particles can be complexed with tethering agents, such agents being selected so that they interact with the polymers used to activate the fines. In one example, partially hydrolyzed polyacrylamide polymers can be used to activate particles, resulting in a particle with anionic charge properties. The cationic charge of the chitosan will attract the anionic charge of the activated particles, to attach the sand particles to the activated fine particles.

In embodiments, various interactions such as electrostatic, hydrogen bonding or hydrophobic behavior can be used to affix a pre-activated/activated particle or particle complex to a tethering material complexed with an anchor particle. In the foregoing example, electrostatic interactions can govern the assembly of the pre-activated/activated fine particle complexes bearing the anionic partially-hydrolyzed polyacrylamide polymer and the cationic sand particles complexed with the chitosan tethering material.

In embodiments, the anchor particles can be combined with a polycationic polymer, for example a polyamine. One or more populations of anchor particles may be used, each being activated with a tethering agent selected for its attraction to the pre-activated/activated fines and/or to the other anchor particle's tether. The tethering functional group on the surface of the anchor particle can be from modification using a multifunctional coupling agent or a polymer. The multifunctional coupling agent can be an amino silane coupling agent as an example. These molecules can bond to an anchor particle's surface and then present their amine group for interaction with the pre-activated/activated fines. In the case of a tethering polymer, the polymer on the surface of the particles can be covalently bound to the surface or interact with the surface of the anchor particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

As an example of a tethering material used with an anchor particle in accordance with these systems and methods, chitosan can be precipitated onto anchor particles, for example, via pH-switching behavior. The chitosan as a tether can have affinity for anionic systems that have been used to activate fine particles. In one example, partially hydrolyzed polyacrylamide polymers can be used to activate the pre-activated fines, resulting in a particle with anionic charge properties. The cationic charge of the chitosan will attract the anionic charge of the activated particles, to attach the anchor particles to the pre-activated/activated fines.

In embodiments, polymers such as linear or branched polyethyleneimine can be used as tethering materials. It would be understood that other anionic or cationic polymers could be used as tethering agents, for example polydiallyldimethylammonium chloride (poly(DADMAC)).

In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly(DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22)ammonium halides, alkyl(C8-C22)trimethylammonium halides, alkyl (C8-C22)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents.

The efficacy of a tethering material, however, can depend on the activating material. A high affinity between the tethering material and the activating material can lead to a strong and/or rapid interaction there between. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In one embodiment, a poly(sodium acrylate-co-acrylamide) activator is matched with a chitosan tether material.

In hydrogen bonding terms, a hydrogen bond donor should be used in conjunction with a hydrogen bond acceptor. In embodiments, the tether material can be complementary to the chosen activator, and both materials can possess a strong affinity to their respective deposition surfaces while retaining this surface property.

In other embodiments, cationic-anionic interactions can be arranged between pre-activated/activated fine particles and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

The anchor particle material is preferably added in an amount that permits a flowable slurry. For example, the particle material can be added in an amount greater than 1 gram/liter but less than the amount which results in a non-flowable sludge or slurry, amounts between about 1 to about 1000 grams/liter, preferably 5 to 100 g/l are often suitable. In some embodiments, it may be desirable to maintain the concentration of the anchor particles to 20 g/l or higher. The anchor particles may be fresh (unused) material, recycled, cleaned ballast, or recycled, uncleaned ballast.

In embodiments, for example when sand is chosen as an anchor particle, higher amounts of the particle material may be added. For example, sand can be added in a range between about 1 to about 300 gm/l, preferably between about 50 to about 300 gm/l, for example at a dosage level of about 240 gm/l.

As an example of a tethering material used with an anchor particle in accordance with these systems and methods, chitosan can be precipitated onto sand particles, for example, via pH-switching behavior. The chitosan can have affinity for anionic systems that have been used to activate fine particles. In one example, partially hydrolyzed polyacrylamide polymers can be used to activate particles, resulting in a particle with anionic charge properties. The cationic charge of the chitosans will attract the anionic charge of the activated particles, to attach the sand particles to the pre-activated/activated fine particles.

In embodiments, various interactions such as electrostatic, hydrogen bonding or hydrophobic behavior can be used to affix an activated particle or particle complex to a tethering material complexed with an anchor particle. In the foregoing example, electrostatic interactions can govern the assembly of the pre-activated/activated fine particle complexes bearing the anionic partially-hydrolyzed polyacrylamide polymer and the cationic sand particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride. The efficacy of a tethering material, however, can depend on the activating material. A high affinity between the tethering material and the activating material can lead to a strong and/or rapid interaction there between.

A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In hydrogen bonding terms, a hydrogen bond donor should be used in conjunction with a hydrogen bond acceptor. In embodiments, the tether material can be complimentary to the chosen activator, and both materials can possess a strong affinity to their respective deposition surfaces while retaining this surface property.

In embodiments, activator polymers useful for tailing activation can be cationic polymers, for example cationic acrylamides. A cationic activator can be paired with an anionic tether, as is described above. In other embodiments, however, the activator polymer can be anionic, for example an anionic polymer selected from the anionic polymers described above as tether polymers. If an anionic polymer is used as an activator, a cationic polymer can be used as a tether. Such a tethering polymer would be selected from the cationic polymers described above as activator polymers.

3. Pre-Activation

As used herein, the term "pre-activation" refers to a processing step in which one or more selected small molecules are added to the tailing solution in advance of activator addition as part of the activated-tethered-anchored (ATA) process, or simultaneous with the addition of activator as part of the ATA process. Pre-activation is a desirable step to improve the shear stability of the consolidated fines produced by the ATA process. Not to be bound by theory, it is understood that pre-activation agents can alter the surface of the fine particles in the tailings stream so that they are more receptive to interaction with activators as part of the ATA process. Pre-activation is particularly advantageous in treating tailings from potash mines, where the high brine level of the tailings stream impairs the shear stability of the consolidated masses produced by ATA without preactivation.

In embodiments the pre-activation of the fine particles in the tailings stream may be performed by addition of a small molecule species. As used herein, the term "pre-activation" refers to the interaction of a modifier such as a small molecule with the individual fine particles in a liquid medium, such as an aqueous solution. The small molecule modifier acting as the pre-activating agent to enhance the receptivity of the fines to the activating agent, so that the pre-activated/activated fines consolidate more thoroughly and rapidly with the tether-bearing anchor particles, and so that the consolidated agglomerates are more stable.

The pre-activation step can act as an initial treatment to prepare the surface of the fine particles for further interactions in the subsequent phases of the disclosed system and methods. It is desirable for a pre-activation agent to have slight solubility in the liquid medium (e.g., the aqueous tailings stream) but to not be highly soluble. For example, the pre-activation step can modify the surface of the fine particles to have less affinity for being in solution, so that they become more predisposed to agglomerate with one another. Not to be bound by theory, it is believed that when the pre-activator interacts with the fine particles, the particles become relatively more hydrophobic, which causes them to be less stable in solution. Additionally, the pre-activated particles may also have a greater affinity to agglomerate and pack together. This modified surface character can be advantageous for subsequent treatment with an activator polymer to enhance the aggregation process of the fine particles before they encounter the tether-bearing anchor particles, and to improve the sedimentation, consolidation and dewatering of the complexes formed between the preactivated/activated fines and the tether-bearing anchor particles.

As an example, a small alkyl molecule with a terminal charged functional group can serve as a pre-activating agent to interact with fines in the aqueous solution. In embodiments, the small molecules used for pre-activation can be charged, including anionic or cationic molecules. In embodiments, anionic molecules can be used, including, for example, fatty acids such as octanoic acid, decanoic acid, dodecanoic acid, tetradecanoic acid, stearic acid, and the like.

As used herein, the term "fatty acid" includes all acyclic aliphatic carboxylic acids having 6 or more carbon atoms, for example those having a chain of six to twenty-eight carbons, which may be saturated or unsaturated, branched or unbranched. Fatty acids may include those aliphatic monocarboxylic acids derived from or contained in esterified form in an animal or vegetable fat, oil or wax. As examples, stearic acid, tall oil acids, and the like may be used. In embodiments, one or more fatty acids can be selected as pre-activation agents, where the fatty acid is deposited on the surface of the fine particles for pre-activating them. In embodiments, fatty acid salts can be used as pre-activation agents, including, for example, sodium ocanoate, sodium decanoate, sodium stearate, and the like. Nonionic pre-activating agents containing PEG or PPG groups can also be used.

In embodiments, cationic compounds can be used as pre-activating agents. Some examples are alkyl amines, including octylamine, decylamine, dodecylamine, undecylamine, N,N-Dimethylnonylamine, and the like. In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

In embodiments, a polyetheramine such as the JEFFAMINE® compounds (listed below in Table 1) can be used as pre-activating agents.

TABLE 1

| JEFFAMINE ® compounds |
| --- |
| JEFFAMINE ® D-2000 diamine Polyetheramine |
| JEFFAMINE ® D-400 |
| JEFFAMINE ® M-2070 |
| JEFFAMINE ® XTJ 548 |
| JEFFAMINE ® XTJ-500 diamine (EO based) Polyetheramines ED-600 |
| JEFFAMINE ® XTJ-501 diamine (EO based) Polyetheramine ED-900 |
| JEFFAMINE ® XTJ-502 diamine (EO based) Polyetheramine ED-2003 |
| JEFFAMINE ® XTJ-505 (M600) |
| JEFFAMINE ® XTJ-506 (M-1000) |
| JEFFAMINE ® XTJ-507 (M-2005) |
| JEFFAMINE ® XTJ-507 (M2005) monoamine polyetheramine |
| JEFFAMINE ® XTJ-509 (T-3000) triamine Polyetheramine |
| JEFFAMINE ® XTJ-542 (Diamine, M~1000, based on [poly(tetramethylene ether glycol)]/PPG copolymer) |
| JEFFAMINE ® XTJ-559 (Diamine, M~1000, based on [poly(tetramethylene ether glycol)]/PPG copolymer) |
| JEFFAMINE ® XTJ-576 (SD-2001) (D-2000 based but both ends are secondary amine) |
| JEFFAMINE ® XTJ-585 (SD-401) (D-400 based but both ends are secondary amine) |

In embodiments, glycol-based surfactants such as Ethox DL-5, Ethox DO-14, and Ethox SO-9, can be used as pre-activating agents. Further, in embodiments, anionic paraffinic emulsions and anionic paraffin/ethylene acrylic acid wax emulsions, such as MICHEM® Emulsion 34935, can be used as pre-activating agents.

In embodiments, monoalkyl branched propoxy sulfates such as Alfoterra surfactants Alfo 123-4s, Alfo 145-4s, Alfo L167-4s, can be as pre-activating agents. In embodiments, low molecular weight block copolymers based on ethylene oxide and propylene oxide, such as BASF's library of PLURONIC® chemicals can be used as pre-activating agents. In embodiments, surfactants including the following representative materials, or low molecular weight polymers incorporating the following representative materials, can be used as pre-activating agents: glycol-bis-(3-(2-alkyl)succinic acid) ester, N,N'-bis(alkyl)polyetherdiamine, and N-alkylpolyetherdiamine.

In embodiments, surfactants useful as activating agents can include amphiphilic polymeric surfactants having a plurality of hydrophobic binding sites and a plurality of hydrophilic binding sites, wherein said polymeric surfactant has: (a) a brush type configuration; (b) a loop type configuration; or (c) comprises a backbone with a plurality of hydrophobic segments and a plurality of pendant hydrophilic polymeric side chains attached to the backbone; and an aqueous vehicle in which the surfactant is suspended or dissolved. Exemplary embodiments of such surfactants have been disclosed in U.S. Patent Application Publication No. 20110100402, the contents of which are incorporated by reference herein in its entirety. In embodiments, such surfactants can comprise a backbone with a plurality of hydrophobic segments and a plurality of pendant hydrophilic polymeric side chains attached to the backbone. The backbone can comprise poly(maleic anhydride-alt-1-octadecene), poly(octadecyl methacrylate-co-acrylic acid), poly(octadecyl methacrylate-co-methacrylic acid), polypropylene-graft-maleic anhydride, poly(isobutylene-co-maleic anhydride), poly(ethylene-alt-maleic anhydride), poly(ethylene-co-glycidyl methacrylate), and the like. The pendant hydrophilic side chains can include poly(ethylene glycol-ran-propylene glycol) monobutyl ether (with a high ratio polyethylene glycol/polypropylene glycol ratio), poly(ethylene glycol) monobutyl ether, JEFFAMINE® monoamine (M series), and the like, and any combination thereof. In embodiments, the surfactant is a block copolymer comprising one or more hydrophilic segments and one or more hydrophobic segments. In embodiments, the block copolymer can comprise poly(propylene glycol) diglycidyl ether-block-JEFFAMINE® ED-600, and poly(propylene glycol) bis(2-aminopropyl ether)-block-poly(ethylene glycol), and the like.

In other embodiments, surfactants useful as activating agents can include compounds such as have been disclosed in U.S. Patent Application Publication No. 20110309001, the contents of which are incorporated by reference herein in their entirety. In an exemplary embodiment, a surfactant can comprise a compound such as that having the Formula below:

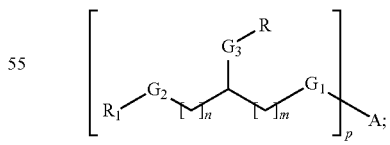

wherein A is an alkyl, alkenyl, alkadienyl, alkynyl, cycloalkyl, or cycloalkenyl, each optionally substituted; p is 1 or 2; m and n are independently 0, 1, 2, 3, 4, or 5; each of $G_1$ and $G_2$ are independently absent, O, S, $NR_2$, (CO)O, O(CO), CO, $CONR_2$, or $R_2CO$;
each $R_2$ is independently H or a lower alkyl; $G_3$ is absent, $(CH_2)_q$ or $G_1$; q is 1, 2, 3, 4 or 5; R is a hydrophilic group; and $R_1$ is a saturated or unsaturated hydrophobic aliphatic group. In certain aspects, m is 1 or 2 and n is 0 or 1. In some embodiments, at least one of $G_1$ and $G_2$ are present. In other exemplary embodiments, a surfactant can comprise a compound such as:

wherein t is 0 or 1; $G_4$ is O or NH; and A and $R_1$ as defined above in this paragraph. In other exemplary embodiments, a surfactant can comprise a compound having the formula below:

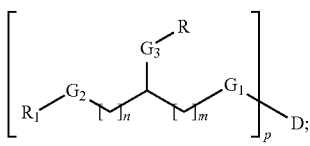

wherein D is an aliphatic polymer; p is 1 or 2; preferably 2; m and n are independently 0, 1, 2, 3, 4, or 5; each of $G_1$ and $G_2$ are independently absent, O, S, $R_2$, (CO)O, O(CO), CO, $CONR_2$, or $NR_2CO$; each $R_2$ is independently H or a lower alkyl;
$G_3$ is absent, $(CH_2)_q$ or $G_1$; q is 1, 2, 3, 4 or 5; R is a hydrophilic group; and $R_1$ is a saturated or unsaturated hydrophobic aliphatic group. In other exemplary embodiments, a surfactant can comprise a compound such as:

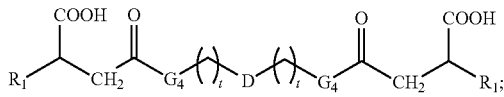

wherein t is 0, 1 or 2; $G_4$ is O or NH; and D and $R_1$ are as defined above in this paragraph. In other exemplary embodiments, a surfactant can comprise a compound such as:

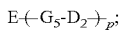

wherein E is alkyl, alkenyl, alkadienyl, alkynyl, cycloalkyl, cycloalkenyl, aryl and heteroaryl; $G_5$ is CONH; $D_2$ is a hydrophilic aliphatic polymer; and p is 1 or 2.

In yet other embodiments, surfactants useful as activating agents can include compounds such as have been disclosed in U.S. Pat. No. 8,227,383, the contents of which are incorporated by reference herein in their entirety. In embodiments, a surfactant can comprise a compound having the formula below:

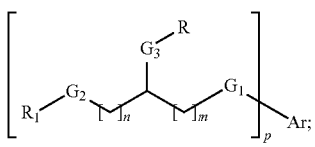

wherein Ar is a substituted or unsubstituted aryl, aralkyl (e.g., benzyl) or heteroaryl group; in some embodiments, Ar is a substituted or unsubstituted aryl, heteroaryl group, preferably a substituted or unsubstituted phenyl group; p is 1 or 2; m and n are independently 0, 1, 2, 3, 4, or 5, preferably 1; each of $G_1$ and $G_2$ are independently absent, O, S, $NR_2$, (CO)O, O(CO), CO, $CONR_2$, or $NR_2CO$; preferably each $G_1$ and $G_2$ are independently O or C(O)O; each $R_2$ is independently H or a lower alkyl; in some embodiments, the lower alkyl is a C1 to C5 alkyl; each $G_3$ is independently absent, $(CH_2)_q$ or $G_1$; q is 1, 2, 3, 4 or 5; R is a hydrophilic group; preferably the hydrophilic group is COOH, or a hydrophilic polymer, such as a polyethylene glycol or a polypropyleneoxide; $R_1$ is a saturated or unsaturated hydrophobic aliphatic group; in some embodiments, $R_1$ is $C_5$ to $C_{18}$ alkyl, alkenyl or alkadienyl, preferably a straight chain $C_5$ to $C_{18}$ alkyl; wherein, when p is 1, Ar is substituted by one or more of $OR_2$, $SR_2$ and $N(R_2)_2$; preferably, when p is 1 Ar is substituted by OH, SH or $NH_2$. In one embodiment, $G_1$ is C(O)O, $G_2$ is absent and n is 0. In embodiments, a surfactant can comprise a compound such as:

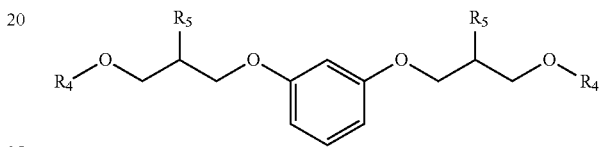

wherein $R_5$ is a hydrophilic group; and $R_4$ is a saturated or unsaturated hydrophobic aliphatic group. In embodiments, a surfactant can comprise a compound having the formula:

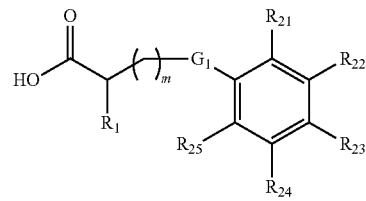

wherein $G_1$ is selected from the group consisting of S, $NR_2$, (CO)O, O(CO), CO, $CONR_2$, and $NR_2CO$; preferably G1 is C(O)O; each $R_2$ is independently H or a lower alkyl; wherein, $R_{21}$, $R_{22}$, $R_{23}$, $R_{24}$, and $R_{25}$ are each independently, H, OH, halogen, C1-C5 alkyl, C1-C5 alkoxy, a $C_3$-$C_7$-cycloalkyl group, a phenyl group optionally substituted by hydroxyl, halogen, lower alkyl or lower alkoxy, or Fragment I having the formula shown below:

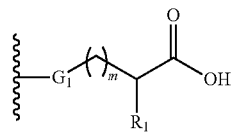

wherein $R_1$, m and $G_1$ are as defined above; wherein at least one of $R_{21}$, $R_{22}$, $R_{23}$, $R_{24}$, and $R_{25}$ is Fragment I or OH; or a salt thereof. In embodiments, a surfactant can comprise a compound such as:

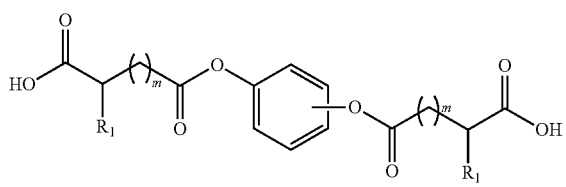

wherein m and $R_1$ are as defined above in this paragraph.

When pre-activation is used in combination with the other steps in tailings treatment, the method of treating tailings can employ four subprocesses: (1) the pre-activation of the wastewater stream bearing the fines by exposing it to a dose of small molecule pre-activator; (2) the activation of the wastewater stream bearing the fines by exposing it to a dose of an activator polymer that attaches to the pre-activated fines; (3) the preparation of tether-bearing anchor particles by coating or otherwise treating selected anchor particles with tether polymer; and (4) adding the tether-bearing anchor particles to the wastewater stream containing the pre-activated/activated fines, so that the tether-bearing anchor particles form complexes with the pre-activated/activated fines.

In embodiments, the pre-activation agent is selected so that it interacts with the fine particles and enhances their ability to consolidate. The activator polymer and the tether polymer have been selected so that they have a natural affinity with each other. Combining the modified and activated fines with the tether-bearing anchor particles rapidly forms a solid complex that can be separated from the suspension fluid with a separator, resulting in a stable mass that can be easily and safely stored, along with clarified water that can be used for other industrial purposes.

As used herein, the term "separator" refers to any mechanism, device, or method that separates the solid complex from the suspension fluid, i.e., that separates the removable complexes of tether-bearing anchor particle and activated particles from the fluid. In embodiments, the solid can be separated from the clarified water in which it resides by a dewatering process, for example by gravity filtration, which can quickly yield a mass that can be easily and safely stored. Following the separation process, the stable mass can be used for beneficial purposes, as can the clarified water. As an example, the clarified water could be recycled for use on-site in further processing and beneficiation of ores. As an example, the stable mass can be used for construction purposes at the mine operation (roads, walls, etc.), or could be used as a construction or landfill material offsite. Dewatering to separate the solids from the suspension fluid can take place in seconds, relying only on gravity filtration. The systems and methods as disclosed herein can more effectively and efficiently remove finely dispersed materials or "fines" from wastewater streams produced during mining operations. In embodiments, the clay fines produced during phosphate beneficiation can be removed with these systems and methods. In embodiments, other types of fines can be removed where these contaminants are suspended in aqueous solutions. In embodiments, the systems and methods disclosed herein are particularly applicable to treating wastewater from potash mining.

Further disclosed herein are systems and methods for enhancing the settlement rate of dispersed fine materials in an aqueous suspension by incorporating them within a coarser particulate matrix, so that solids can be removed from aqueous suspension as a material having mechanical stability. In embodiments, the systems and methods disclosed herein for enhancing the settlement rate of dispersed fine materials can involve four components: pre-activating the fine particles, activating the pre-activated fine particles, complexing the pre-activated/activated fines to tether-bearing anchor particles, and sedimenting the fine particle-anchor particle complex.

4. Settling and Separation

It is envisioned that the complexes formed from the anchor particles and the pre-activated/activated particulate matter can be recovered and used for other applications. For example, when sand is used as the modified particle and it captures fine clay in tailings, the dewatered sand/clay combination can be used for road construction in the vicinity of the mining sites, due to the less compactable nature of the complexes compared to other locally available materials. As another example, a sand/clay complex could be used to fill in strip mining pits, such as would be found at phosphate mining operations. In other embodiments, complexes with anchor particles and fines could be used in a similar manner on-site to fill in abandoned mines, or the complexes could be used off-site for landfill or construction purposes. The uses of the solid material produced by the systems and methods disclosed herein will vary depending on the specific constituents of the material.

In embodiments, the interactions between the pre-activated/activated fine particles and the tether-bearing anchor particles can enhance the mechanical properties of the complex that they form. For example, a pre-activated/activated fine particle or collection thereof can be durably bound to one or more tether-bearing anchor particles, so that they do not segregate or move from the position that they take on the particles. This property of the complex can make it mechanically more stable.

Increased compatibility of the pre-activated/activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques are available for removing the activated-tethered-anchored ("ATA") complexes from the fluid stream. For example, the tether-bearing anchor particles can be mixed into a stream carrying pre-activated/activated fine particles, and the complexes can then be separated via a settling process such as gravity or centrifugation. In another method, the process stream carrying the pre-activated/activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. In the aforesaid removal processes, mechanical interventions for separating the ATA complexes can be introduced, employing various devices as separators (filters, skimmers, centrifuges, and the like). Or other separation techniques can be employed. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field.

As would be further appreciated by those of ordinary skill, tether-bearing anchor particles could be designed to complex with a specific type of activated particulate matter. The systems and methods disclosed herein could be used for complexing with organic waste particles, for example. Other pre-activation/activation-tethering-anchoring systems may be envisioned for removal of suspended particulate matter in fluid streams, including gaseous streams.

EXAMPLES

The following materials were used in the Examples below:
Poly(diallyldimethylammonium chloride) (PDAC) (20% w/v), Sigma Aldrich, St. Louis, Mo.
KEMFLOW® E-4764, Kemira Chemicals, Atlanta, Ga.
KEMFLOW® A-4251, Kemira Chemicals, Atlanta, Ga.
HYPERFLOC® CP 905 HH, Hychem, Tampa, Fla.
MAGNAFLOC® 336, BASF, Florham Park, N.J.
Potash tailings samples
Phosphate tailings samples
Dodecanoic acid, Sigma Aldrich, St. Louis, Mo.
MAGNAFLOC® 919, BASF, Florham Park, N.J.
Sodium dodecanoate, Sigma Aldrich, St. Louis, Mo.
Sodium tetradecanoate, Sigma Aldrich, St. Louis, Mo.
FLOPAM™ AN 913 VHM, SNF, Riceboro, Ga.
Hexadecylamine, Sigma Aldrich, St. Louis, Mo.
Dodecylamine, Sigma Aldrich, St. Louis, Mo.
JEFFAMINE® M2005, Huntsman, Houston, Tex.
JEFFAMINE® M2070, Huntsman, Houston, Tex.
Isopropanol (IPA), Sigma Aldrich, St. Louis, Mo.

Example 1: Polymers Used

Solutions of the polymers shown in Table 2 were prepared and kept at room temperature. All solutions were prepared at 0.1 wt % concentration using tap water. These polymer solutions were screened for use in consolidating tailings. Polymer solutions were screened for use as activator polymers or as tether polymers to be attached to anchor particles, as described in more detail below. When a polymer was used as a tether polymer, it was used in combination with a separate activator polymer. For anchor particles to be used with tether polymers, coarse waste particles from a mining operation were used. In experiments using anchor particles with tethers, the ratio of anchor particles to clays in the tailings was 1.0 on a mass basis.

TABLE 2

Polymers screened for treatment of tailings

| Polymer | Manufacturer | Charge | Charge Density | Molecular Weight (g/mol) |
|---|---|---|---|---|
| HYPERFLOC® CP 905 HH | Hychem, Inc | Cationic | Low | 5,000,000 |
| KEMFLOW® E-4764 | Kemira | Anionic | — | Ultra high |
| KEMFLOW® A-4251 | Kemira | Anionic | 15% | Ultra high |
| MAGNAFLOC® 336 | BASF | Anionic | 30% | Very high |

TABLE 2-continued

Polymers screened for treatment of tailings

| Polymer | Manufacturer | Charge | Charge Density | Molecular Weight (g/mol) |
|---|---|---|---|---|
| MAGNAFLOC® 919 | BASF | Anionic | 50% | Very high |
| PDAC | Sigma-Aldrich | Cationic | 100% | 400,000-500,000 |
| FLOPAM® AN 913 VHM | SNF | Anionic | 13% | Very high |

Example 2: Modifiers Used

Solutions of the modifiers shown in Table 3 were prepared and kept at room temperature. All solutions were prepared at 0.1 wt % concentration in the solvents listed below. These modifier solutions were screened for use in consolidating mining tailings. The modifiers are added first to modify the surface of the fine particles in the tailings to enhance consolidation, separation, and stability.

TABLE 3

Modifiers screened for treatment of potash tailings

| Modifier | Manufacturer | Charge | Solvent |
|---|---|---|---|
| Dodecanoic acid | Sigma Aldrich | Anionic | IPA |
| Sodium dodecanoate | Sigma Aldrich | Anionic | Water |
| Sodium tetradecanoate | Sigma Aldrich | Anionic | Water |
| Hexadecylamine | Sigma Aldrich | Cationic | IPA |
| Dodecylamine | Sigma Aldrich | Cationic | IPA |
| JEFFAMINE® M2005 | Huntsman | Neutral/Cationic | Water |
| JEFFAMINE® M2070 | Hunstman | Neutral/Cationic | Water |

Example 3: Potash Tailings Samples

Tailings samples from an operating potash mine were used to assess the efficacy of various modifier solutions and polymeric solutions as activator polymers and tether polymers. The composition of the tailings samples was approximately:
2.1 wt % clays
97.9 wt % saturated brine solution.
Anchor particles were comprised of coarse salt particles that exist as an 81.0% solids content stream.

Example 4: Potash Tailings Treatment with Activator and Tether Polymers

Before each treatment, the tailings sample was agitated with an overhead mixer to resuspend salt and clay suspensions that settled. For samples treated with both activator and tether polymers, an activator polymer was selected to pre-treat the tailings sample, following which the solution was inverted six times. Tether-bearing anchor particles were prepared by adding an amount of the tether polymer solution to a sample of anchor particles and shaking for 10 seconds. The activated fines were poured into the container with the tether-bearing coarse particles and the container was inverted six times. After one minute, the turbidity of the supernatant was measured, and then the solids were analyzed for solids content after gravity filtration on a 70-mesh screen. Results of these experiments are shown below in Table 4.

TABLE 4

Results of treatment with activator and tether-bearing anchor particles

| Activator | Dosage (ppm) | Tether | Dosage (ppm) | Turbidity (NTU) | Solids (%) |
|---|---|---|---|---|---|
| KEWMFLOW ® E-4764 | 200 | PDAC | 200 | 55.5 | 56.9 |
| KEWMFLOW ® E-4764 | 400 | PDAC | 200 | 56.8 | 57.5 |
| KEWMFLOW ® E-4764 | 400 | PDAC | 400 | 49.7 | 58.2 |
| KEWMFLOW ® A-4251 | 200 | PDAC | 200 | 102 | 60.8 |
| KEWMFLOW ® A-4251 | 400 | PDAC | 200 | 36.3 | 62.3 |
| KEWMFLOW ® A-4251 | 400 | PDAC | 400 | 53.8 | 61.2 |
| MAGNAFLOC ® 336 | 200 | HYPER-FLOC ® CP 905 HH | 200 | 43.1 | 59.2 |
| MAGNAFLOC ® 336 | 400 | HYPER-FLOC ® CP 905 HH | 200 | 49.1 | 62.4 |
| MAGNAFLOC ® 336 | 400 | HYPER-FLOC ® CP 905 HH | 400 | 46.9 | 60.7 |
| KEWMFLOW ® E-4764 | 200 | HYPER-FLOC ® CP 905 HH | 200 | 34.7 | 60.3 |
| KEWMFLOW ® E-4764 | 400 | HYPER-FLOC ® CP 905 HH | 200 | 47.2 | 59.5 |
| KEWMFLOW ® E-4764 | 400 | HYPER-FLOC ® CP 905 HH | 400 | 43.6 | 61.6 |
| KEWMFLOW ® E-4251 | 200 | HYPER-FLOC ® CP 905 HH | 200 | 28.3 | 63.5 |
| KEMFLOW ® E-4251 | 400 | HYPER-FLOC ® CP 905 HH | 400 | 31.2 | 62.9 |

Example 5: Potash Tailings Treatment with Modifier and Activator and Tether Polymers Before each treatment, the tailings sample was agitated with an overhead mixer to resuspend salt and clay suspensions that settled. First, an amount of modifier solution was added to the tailings sample followed by immediate vigorous shaking for 10 seconds. For samples treated with both activator and tether polymers, an activator polymer was selected to further the tailings sample, following which the solution was inverted six times. Tether-bearing anchor particles were prepared by adding an amount of the tether polymer solution to a sample of anchor particles and shaking for 10 seconds. The modified and activated fines were poured into the container with the tether-bearing coarse particles and the container was inverted six times. After one minute, the turbidity of the supernatant was measured, and then the solids were analyzed for solids content after gravity filtration on a 70-mesh screen. Results are shown in Table 5 below.

TABLE 5

Results of treatment with modifier, activator, and tether-bearing anchor particles

| Modifier | Dosage (ppm) | Activator | Dosage (ppm) | Tether | Dosage (ppm) | Turbidity (NTU) | Solids (%) |
|---|---|---|---|---|---|---|---|
| Dodecanoic acid | 500 | KEMFLOW ® A-4251 | 400 | PDAC | 200 | 29.4 | 63.2 |
| Dodecanoic acid | 500 | KEMFLOW ® A-4251 | 600 | PDAC | 200 | 36.1 | 62.8 |
| Dodecanoic acid | 500 | MAGNAFLOC ® 336 | 400 | PDAC | 200 | 32.1 | 63.9 |
| Dodecanoic acid | 500 | MAGNAFLOC ® 336 | 400 | PDAC | 200 | 34.3 | 63.9 |
| Dodecanoic acid | 500 | MAGNAFLOC ® 336 | 500 | PDAC | 250 | 37.9 | 63.3 |
| Dodecanoic acid | 500 | MAGNAFLOC ® 336 | 600 | PDAC | 300 | 36.1 | 59.6 |
| Dodecanoic acid | 500 | MAGNAFLOC ® 336 | 800 | PDAC | 400 | 39.5 | 60.0 |
| Dodecanoic acid | 500 | KEMFLOW ® A-4251 | 400 | HYPER-FLOC ® CP 905 HH | 200 | 31.8 | 66.1 |

Example 5: Settling Rates after Treatment with Activator and Tether Polymers Before each treatment, the tailings sample was agitated with an overhead mixer to resuspend salt and clay suspensions that settled. For samples treated with both activator and tether polymers, an activator polymer was selected to pre-treat the tailings sample, following which the solution was inverted six times. Tether-bearing anchor particles were prepared by adding an amount of the tether polymer solution to a sample of anchor particles and shaking for 10 seconds. The activated fines were poured into the container with the tether-bearing coarse particles and the container was inverted six times. The sample produced using the components set forth in Table 6 was poured into a 250 mL graduated cylinder, and the interface between the solids and the supernatant solution was measured as a function of time, shown in FIG. 1. Subsequently, the sample was poured into a glass jar and agitated with an overhead mixer at 500 rpm for 15 seconds to introduce shear. The overhead mixer had a three-tip mixing impeller approximated 2" in diameter. The sample was poured back into a 250 mL graduated cylinder, and the interface between the solids and the supernatant solution was measured as a function of time, shown in FIG. 1.

TABLE 6

Treatment with activator and tether-bearing anchor particles for settling rate analysis

| Activator | Dosage (ppm) | Tether | Dosage (ppm) |
|---|---|---|---|
| MAGNA-FLOC ® 919 | 400 | HYPERFLOC ® CP 905 HH | 200 |

Figure 2:
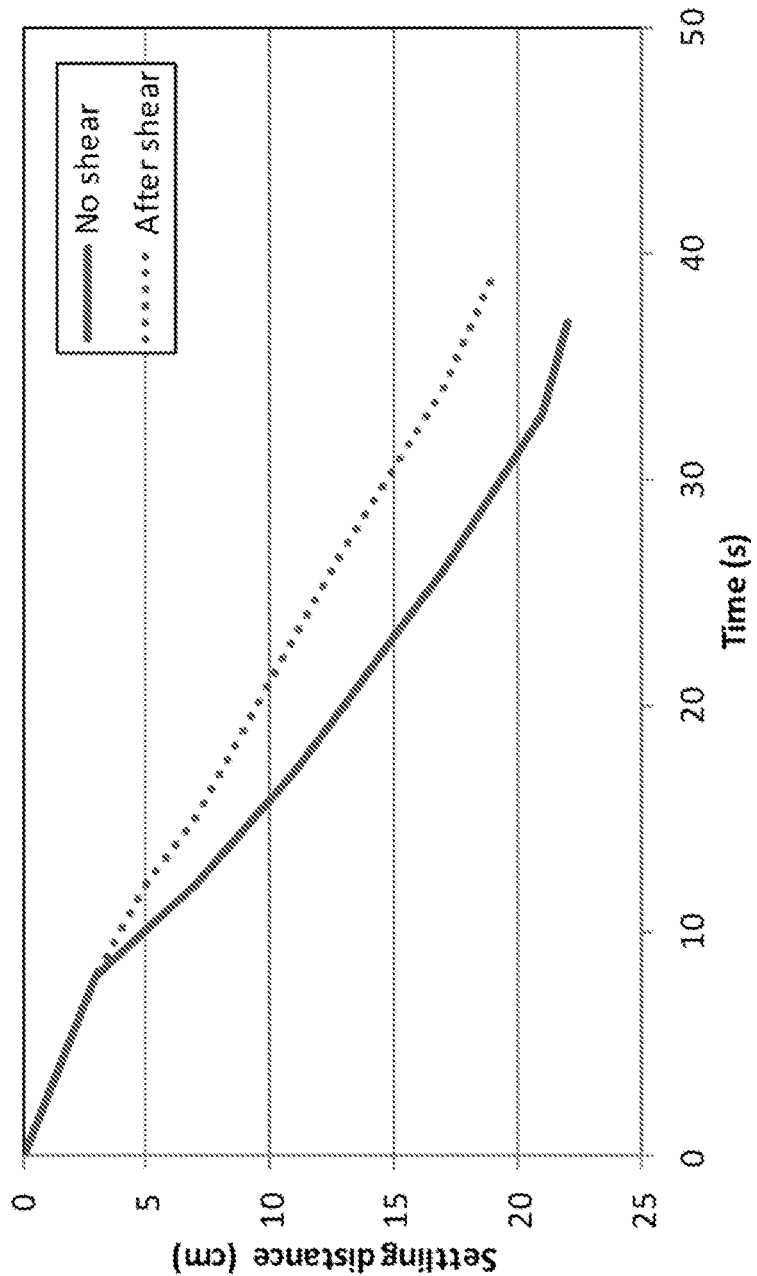
FIG. 2 shows a graph illustrating settling rates after treatment with modifier, activator, and tether polymers, before and after shear.
Figure 3:
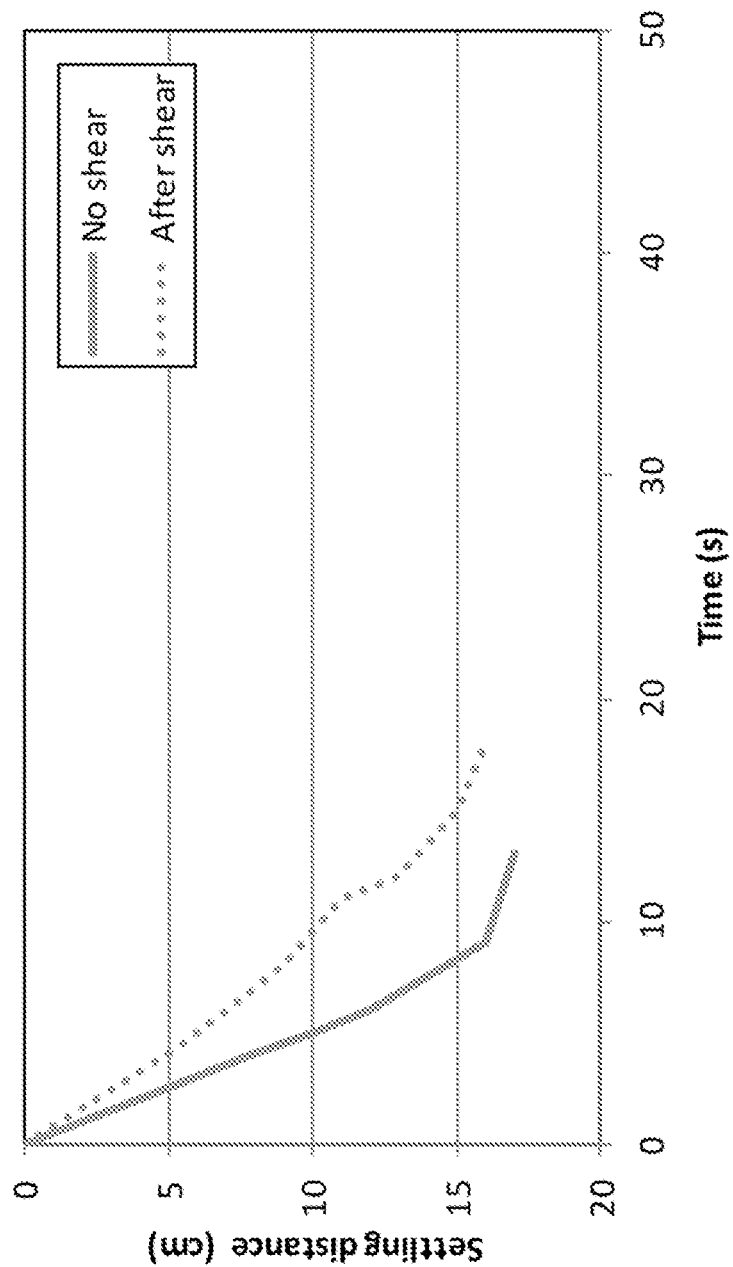
FIG. 3 shows a graph illustrating settling rates after treatment with modifier, activator and tether polymers, before and after shear.

Example 6: Settling Rates after Treatment with Modifier and Activator and Tether Polymers Before each treatment, the tailings sample was agitated with an overhead mixer to resuspend salt and clay suspensions that settled. First, an amount of modifier solution was added to the tailings sample followed by immediate vigorous shaking for 10 seconds. For samples treated with both activator and tether polymers, an activator polymer was selected to further the tailings sample, following which the solution was inverted six times. Tether-bearing anchor particles were prepared by adding an amount of the tether polymer solution to a sample of anchor particles and shaking for 10 seconds. The sample prepared using the components set forth in Table 7 was poured into a 250 mL graduated cylinder, and the interface between the solids and the supernatant solution was measured as a function of time, shown in FIG. 2. Subsequently, the sample was poured into a glass jar and agitated with an overhead mixer at 500 rpm for 15 seconds to introduce shear. The overhead mixer had a three-tip mixing impeller approximated 2" in diameter. The sample was poured back into a 250 mL graduated cylinder, and the interface between the solids and the supernatant solution was measured as a function of time, shown in FIG. 2. FIG. 3 shows another example of the results of this process, using the chemicals and doses set forth in Table 8.

TABLE 7

Treatment with modifier and activator and tether-bearing anchor particles for settling rate analysis

| Modifier | Dosage (ppm) | Activator | Dosage (ppm) | Tether | Dosage (ppm) |
|---|---|---|---|---|---|
| Sodium dodecanoate | 500 | MAGNA-FLOC ® 919 | 400 | HYPER-FLOC ® CP 905 HH | 200 |

TABLE 8

Treatment with modifier and activator and tether-bearing anchor particles for settling rate analysis

| Modifier | Dosage (ppm) | Activator | Dosage (ppm) | Tether | Dosage (ppm) |
|---|---|---|---|---|---|
| Sodium tetradecanoate | 500 | FLOPAM ® AN 913 VHM | 400 | HYPER-FLOC ® CP 905 HH | 200 |

Example 7: Phosphate Tailings Samples

Tailings samples from an operating phosphate mine were used to assess the efficacy of various modifier solutions and polymeric solutions as activator polymers and tether polymers. The composition of the tailings samples was approximately:
5.0 wt % fines particulates
95.0 wt % water.
Anchor particles were comprised of coarse sand particles that exist as a 75.0% solids content stream.

Example 8: Phosphate Tailings Treatment with Activator and Tether Polymers

Before each treatment, the tailings sample was agitated with an overhead mixer to resuspend salt and clay suspensions that settled. For samples treated with both activator and tether polymers, an activator polymer was selected to pre-treat the tailings sample, following which the solution was inverted six times. Tether-bearing anchor particles were prepared by adding an amount of the tether polymer solution to a sample of anchor particles and shaking for 10 seconds. The activated fines were poured into the container with the tether-bearing coarse particles and the container was inverted six times. After one minute, the turbidity of the supernatant was measured, and then the solids were analyzed for solids content after gravity filtration on a 70-mesh screen. Table 9 shows the results of the ATA process only, to be compared to the results shown in Table 10.

TABLE 9

Results of treatment with activator and tether-bearing anchor particles

| Activator | Dosage (ppm) | Tether | Dosage (ppm) | Turbidity (NTU) | Solids (%) |
|---|---|---|---|---|---|
| MAGNA-FLOC ® 336 | 750 | PDAC | 375 | 297 | 50.5 |

Example 9: Phosphate Tailings Treatment with Modifier and Activator and Tether Polymers Before each treatment, the tailings sample was agitated with an overhead mixer to resuspend salt and clay suspensions that settled. First, an amount of modifier solution was added to the tailings sample followed by immediate vigorous shaking for 10 seconds. For samples treated with both activator and tether polymers, an activator polymer was selected to further the tailings sample, following which the solution was inverted six times. Tether-bearing anchor particles were prepared by adding an amount of the tether polymer solution to a sample of anchor particles and shaking for 10 seconds. The modified and activated fines were poured into the container with the tether-bearing coarse particles and the container was inverted six times. After one minute, the turbidity of the supernatant was measured, and then the solids were analyzed for solids content after gravity filtration on a 70-mesh screen. The results are set forth in Table 10.

TABLE 10

Results of treatment with modifier, activator, and tether-bearing anchor particles

| Modifier | Dosage (ppm) | Activator | Dosage (ppm) | Tether | Dosage (ppm) | Turbidity (NTU) | Solids (%) |
|---|---|---|---|---|---|---|---|
| Hexadecylamine | 500 | MAG-NAF-LOC® 336 | 750 | PDAC | 375 | 210 | 51.0 |
| Hexadecylamine | 2000 | MAG-NAF-LOC® 336 | 750 | PDAC | 375 | 200 | 44.6 |
| Hexadecylamine | 50 | MAG-NAF-LOC® 336 | 750 | PDAC | 375 | 273 | 54.4 |
| JEFFAMINE® M2005 | 500 | MAG-NAF-LOC® 336 | 750 | PDAC | 375 | 228 | 51.5 |
| JEFFAMINE® M2005 | 500 | MAG-NAF-LOC® 919 | 750 | PDAC | 375 | 175 | 52.9 |
| JEFFAMINE® M2005 | 500 | MAG-NAF-LOC® 336 | 750 | HYPER-FLOC® CP 905 HH | 375 | 625 | 54.7 |
| JEFFAMINE® M2005 | 1000 | MAG-NAF-LOC® 336 | 750 | PDAC | 375 | 223 | 55.8 |
| JEFFAMINE® M2005 | 4200 | MAG-NAF-LOC® 336 | 750 | PDAC | 375 | 187 | 51.8 |
| JEFFAMINE® M2070 | 500 | MAG-NAF-LOC® 336 | 750 | PDAC | 375 | 246 | 54.4 |
| JEFFAMINE® M2070 | 1000 | MAG-NAF-LOC® 336 | 750 | PDAC | 375 | 245 | 53.2 |
| JEFFAMINE® M2070 | 4500 | MAG-NAF-LOC® 336 | 750 | PDAC | 375 | 239 | 51.3 |
| Dodecylamine | 50 | MAG-NAF-LOC® 336 | 750 | PDAC | 375 | 187 | 49.6 |

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of removing particulate matter from a potash tailing fluid, wherein the particulate matter is derived from a potash mining operation, wherein the particulate matter is clay particles and wherein the potash tailing fluid comprises brine, the method comprising:

contacting the particulate matter with a pre-activating material to form a pre-activated particulate matter, wherein the pre-activating material is a fatty acid or fatty acid salt;

affixing an activating material to the pre-activated particulate matter to form an activated particle, wherein the activating material is anionic partially hydrolyzed polyacrylamide;

attaching a tethering material to an anchor particle to form a tether-bearing anchor particle, wherein the tethering material is a cationic polymer; and adding the tether-bearing anchor particle to the fluid containing the activated particle to form a removable complex in the fluid, wherein the removable complex comprises the particulate matter and the anchor particle.

2. The method of claim 1, further comprising removing the removable complex from the potash tailing fluid.

3. The method of claim 2, wherein the removable complex is removed by filtration.

4. The method of claim 2, wherein the removable complex is removed by centrifugation.

5. The method of claim 2, wherein the removable complex is removed by gravitational settling.

6. The method of claim 1, wherein the anchor particle comprises sand.

7. The method of claim 1, wherein the anchor particle comprises a material indigenous to the potash mining operation.

8. The method of claim 1, further comprising chemically modifying the potash tailing fluid.

9. The method of claim 1, wherein the potash tailing fluid comprises impounded tailings in a containment area.

10. The method of claim 1, wherein the fatty acid is selected from the group consisting of octanoic acid, decanoic acid, dodecanoic acid, tetradecanoic acid and stearic acid.

11. The method of claim 1, wherein the fatty acid salt is selected from the group consisting of sodium octanoate, sodium decanoate, and sodium stearate.

* * * * *